(12) United States Patent
Wang et al.

(10) Patent No.: US 12,351,473 B1
(45) Date of Patent: Jul. 8, 2025

(54) PROCESS METHOD FOR PREPARING MAGNESIUM OXIDE FROM DOLOMITE

(71) Applicant: Taiyuan University of Technology, Taiyuan (CN)

(72) Inventors: Yongzhen Wang, Taiyuan (CN); Chong Zhang, Taiyuan (CN); Deyin Wang, Taiyuan (CN); Xiaomin Wang, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 0 days.

(21) Appl. No.: 19/008,700

(22) Filed: Jan. 3, 2025

(30) Foreign Application Priority Data

May 10, 2024 (CN) .......................... 202410578967.1

(51) Int. Cl.
*C01F 5/06* (2006.01)
*B01D 11/02* (2006.01)
(52) U.S. Cl.
CPC ............ *C01F 5/06* (2013.01); *B01D 11/0288* (2013.01); *C01P 2002/72* (2013.01); *C01P 2006/80* (2013.01)
(58) Field of Classification Search
CPC ............................... C01F 5/06; B01D 11/0288
See application file for complete search history.

(56) References Cited

FOREIGN PATENT DOCUMENTS

| CN | 102225775 A | | 10/2011 |
|---|---|---|---|
| CN | 103913452 A | | 7/2014 |
| CN | 106866004 A | * | 6/2017 |
| KR | 20200135091 A | | 12/2020 |

* cited by examiner

*Primary Examiner* — James A Fiorito
(74) *Attorney, Agent, or Firm* — Bayramoglu Law Offices LLC

(57) ABSTRACT

A process method for preparing magnesium oxide from dolomite includes the following steps: S1, pretreating dolomite to obtain the calcined dolomite; S2, hydrating the calcined dolomite according to the solid-liquid ratio, controlling the hydration temperature and the hydration time, filtering, washing and drying after hydration to obtain the hydration product; S3, configuring a complex solution, using the sodium hydroxide solution to adjust the pH value to 8-10; S4, performing the complexation reaction by mixing the hydration product in S2 with the complex solution in S3, and controlling the complexation temperature and the complexation time, obtaining the magnesium oxide by filtration, washing and drying after the reaction is completed. The invention uses dolomite as raw material, and the amount of magnesium hydroxide produced by magnesium oxide at a specific hydration temperature and hydration time can be ignored.

5 Claims, 2 Drawing Sheets

PROCESS METHOD FOR PREPARING MAGNESIUM OXIDE FROM DOLOMITE

CROSS REFERENCE TO THE RELATED APPLICATIONS

This application is based upon and claims priority to Chinese Patent Application No. 202410578967.1, filed on May 10, 2024, the entire contents of which are incorporated herein by reference.

TECHNICAL FIELD

The invention relates to the field of magnesium oxide preparation technology, in particular to a process method for preparing magnesium oxide from dolomite.

BACKGROUND

Magnesium oxide is an important magnesium compound for the development of national economic construction. For example, in the building materials industry, electronics industry, defense industry, aviation industry, etc., magnesium oxide plays an important role. Therefore, the preparation of magnesium oxide has become an urgent problem to be solved.

At present, the raw materials for the preparation of magnesium oxide mainly include magnesite ($MgCO_3$), dolomite ($CaCO_3 \cdot MgCO_3$), bischofite, magnesium-containing industrial by-products, seawater or salt lake brine ($MgCl_2$), magnesium-containing ore, etc., and basic magnesium carbonate or magnesium hydroxide is used as an intermediate to prepare magnesium oxide. The specific preparation methods mainly include the magnesium ore carbonization method, ammonia method, carbon ammonia method, brine pyrolysis method, and so on. However, each method has its own shortcomings. For example, the magnesium ore carbonization method has the disadvantages of high energy consumption, high production cost, and low purity, so this method cannot be used in industrial production; ammonia method: magnesium oxide is easy to form colloid and the process is difficult to control, resulting in local sintering, low activity, and low recovery rate, and environmental protection problems are more prominent; carbon ammonia method: relatively large pollution, poor working environment; brine pyrolysis: high requirements for equipment, easy to cause greater pollution to the environment, low recovery rate of raw materials. Based on the above problems in the preparation of magnesium oxide, it has become a crucial issue to find a preparation method for magnesium oxide with a short process, low energy consumption, and low cost.

SUMMARY

The purpose of the invention is to provide a process method for preparing magnesium oxide from dolomite, using dolomite as raw material, the amount of magnesium hydroxide generated by magnesium oxide at a specific hydration temperature and hydration time can be neglected, with the addition of complexing agent, calcium ions are complexed to obtain magnesium oxide and a small amount of impurities, it has the advantages of a short preparation process, low energy consumption, low cost, and no residue.

To achieve the above purpose, the invention provides a process method for preparing magnesium oxide from dolomite, including the following steps:

S1, pretreating dolomite to obtain calcined dolomite;

S2, hydrating the calcined dolomite according to a solid-liquid ratio, controlling a hydration temperature and a hydration time, filtering, washing, and drying after hydration to obtain a hydration product;

S3, configuring a complex solution, using a sodium hydroxide solution to adjust a pH value to 8-10;

S4, performing a complexation reaction by mixing the hydration product in S2 with the complex solution in S3, and controlling a complexation temperature and a complexation time, obtaining a magnesium oxide by filtration, washing, and drying after the reaction is completed.

Preferably, in S1, first, crushing and ball-milling the dolomite, and sieving a ball-milled dolomite powder, and a mesh of a sieve is 60-200 mesh; then calcining a sieved dolomite powder in a tube furnace, a calcination temperature is 850-1100° C. and a calcination time is 1-3 h.

Preferably, in S2, the solid-liquid ratio of the calcined dolomite is 0.5-2 g/L, during the hydration process, the hydration temperature is 40-90° C., the hydration time is 0.5-1.5 h, and a stirring speed of hydration is 30-90 r/min.

Preferably, in S3, a configuration process of the complex solution: dissolving a complexing agent in 200-500 mL of deionized water, stirring for 0.5 h, and a rotation speed is 300-350 r/min.

Preferably, in S3, the complexing agent is one or more of ethylenediaminetetraacetic acid disodium, triethanolamine, oxalic acid, and citric acid.

Preferably, the concentration of sodium hydroxide solution in S3 is 0.1 mol/L.

Preferably, in S4, a temperature of the complexation reaction is 40-90° C., a time of the complexation reaction is 10-40 min, and a stirring speed is 30-90 r/min.

Preferably, washing conditions for the S2 and S4: washing with deionized water 3-5 times and vacuum drying.

Therefore, this invention provides a process method for preparing magnesium oxide from dolomite, using dolomite as raw material, the amount of magnesium hydroxide generated by magnesium oxide at a specific hydration temperature and hydration time can be neglected, with the addition of a complexing agent, calcium ions are complexed to obtain magnesium oxide and a small amount of impurities.

The products of calcined dolomite are mainly magnesium oxide and calcium oxide, in the process of hydration, due to the difficulty in the process of magnesium oxide reacting with water to form magnesium hydroxide, the amount of magnesium oxide forming magnesium hydroxide at a specific hydration temperature and time can be ignored. Calcium oxide reacts with water to form calcium hydroxide violently, however, because calcium hydroxide is slightly soluble in water, the solubility increases with the decrease of temperature. At a specific hydration temperature and hydration time, part of the calcium hydroxide formed by calcium oxide is dissolved in water and separated from the filter, and part of it remains in the filter in the form of precipitation, and because the complex solution can complex calcium ions well at a specific pH, and magnesium ions only complex a small part of the calcium ions, the calcium hydroxide precipitation remaining in the filter is complexed by the complex solution, and the calcium ions are separated from the filter in the form of solution. Therefore, only magnesium oxide and a small amount of other impurities are left in the filter after complexation, and finally, magnesium oxide with high purity is prepared.

Compared with traditional technology, this preparation method has the advantages of a simple process, low energy consumption, low cost, and no residue.

The following is a further detailed description of the technical scheme of the invention through drawings and embodiments.

DETAILED DESCRIPTION OF THE EMBODIMENTS

The following is a further explanation of the technical scheme of the invention through figures and embodiments.

In order to make the purpose, technical scheme, and advantages of the embodiment of the invention more clear, the following will describe the technical scheme of the embodiment of the invention clearly and completely in combination with the attached diagram of the embodiment of the invention. Obviously, the described embodiment is part of the embodiments of the invention, not all of the embodiments.

Figure 1:
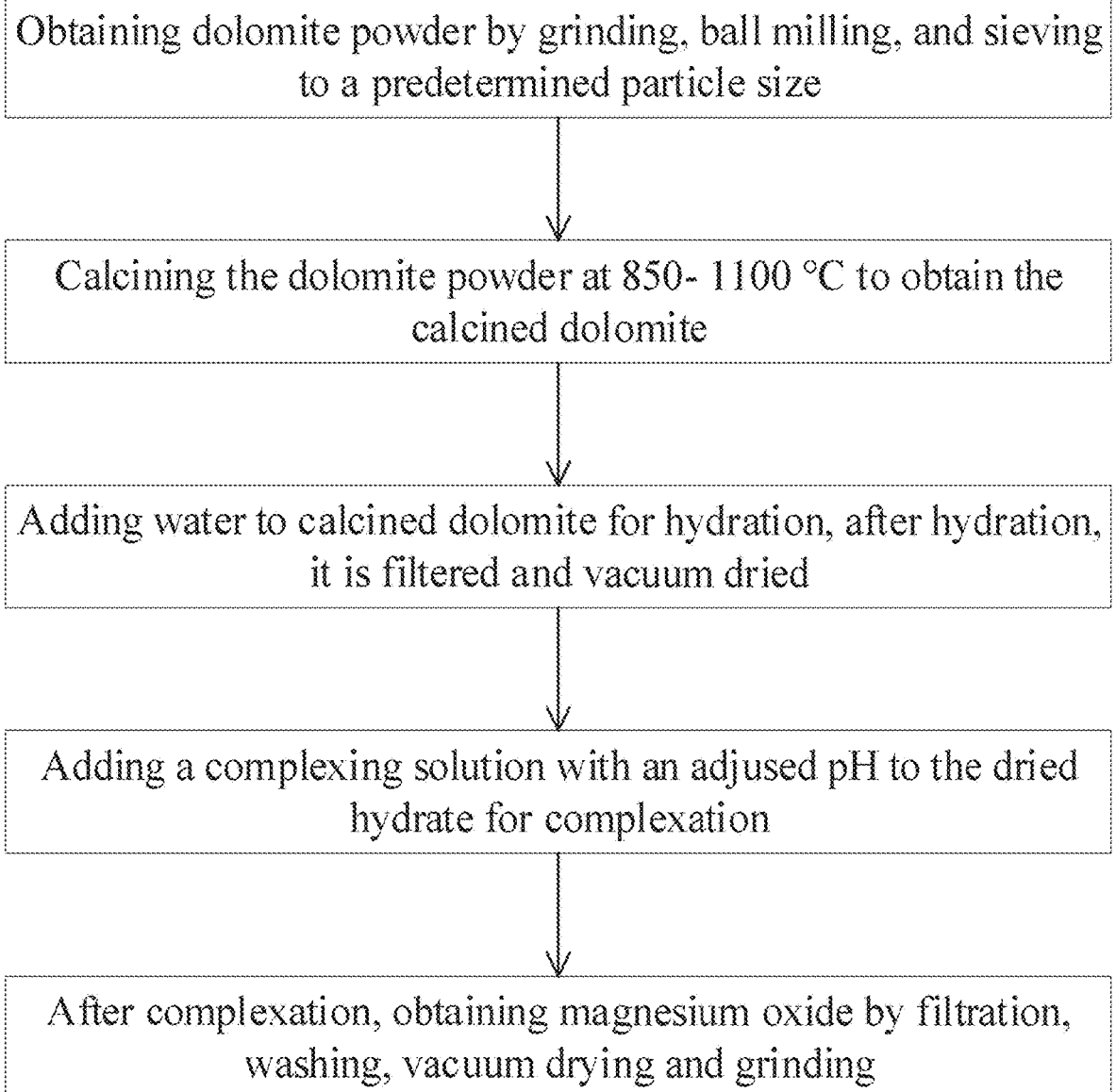
FIG. 1 is a flow chart of the embodiment of the invention.
Figure 2:
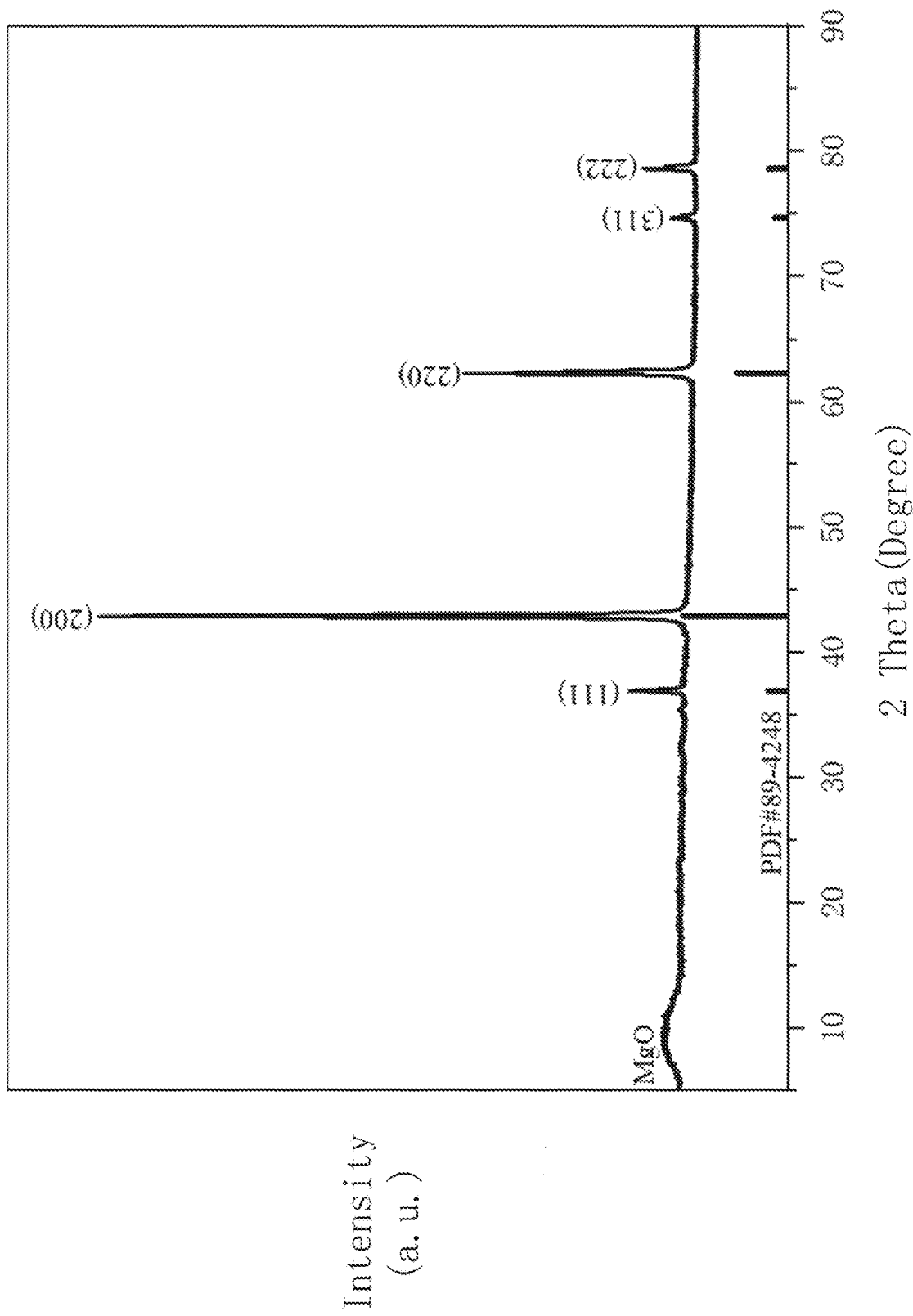
FIG. 2 is an XRD pattern of magnesium oxide in the embodiment of the invention.

The invention provides a process method for preparing magnesium oxide from dolomite, as shown in FIG. 1, the method includes the following steps: first, the dolomite is crushed and ball-milled, and the milled dolomite powder is sieved in a 60-200 mesh sieve; the sieved dolomite powder is calcined in a tube furnace, the calcination temperature is 850-1100° C. and the calcination time is 1-3 h to obtain the calcined dolomite;

the calcined dolomite is hydrated according to the solid-liquid ratio of 0.5-2 g/L, the hydration temperature is controlled at 40-90° C., the hydration time is 0.5-1.5 h, and the stirring speed of hydration is 30-90 r/min, after filtration, washing, and drying, the hydration product is obtained;

one or more of disodium ethylenediaminetetraacetate, triethanolamine, oxalic acid, and citric acid are used as complexing agents in a beaker, the complex solution is prepared by dissolving 200-500 mL of deionized water in a beaker, and the pH value is adjusted to 8-10 by 0.1 mol/L sodium hydroxide solution;

and then the complex solution is mixed with the hydration product to perform the complexation reaction, the complexation temperature is 40-90° C., the complexation time is 10-40 min, and the stirring speed is 30-90 r/min, after the reaction is completed, the magnesium oxide is obtained by filtration, washing, and drying.

The filtration method in the invention can be suction filtration, pressure filtration, etc., the washing method is to wash 3-5 times with deionized water, and the drying condition is vacuum drying.

In this invention, dolomite is used as raw material for calcine treatment, the reaction equation of calcination is $CaCO_3 \cdot MgCO_3(s) \rightarrow MgO(s) + CaO(s) + 2CO_2\uparrow$ (high temperature); the calcined dolomite powder is hydrated at a specific hydration temperature and hydration time, the hydration reaction equation is $MgO(s) + 2CaO(s) + 2H_2O(aq) \rightarrow MgO(s) + 2Ca(OH)_2(s)\downarrow$; after hydration and filtration, the impurities of magnesium oxide, calcium hydroxide, and other elements are obtained by filtration, the hydrates are placed in a vacuum drying oven for drying treatment, and the dried hydrates are placed in a complex solution at a specific pH value for complexation reaction. After complexation, the magnesium oxide is obtained by filtration, washing, and vacuum drying.

Embodiment 1

This embodiment provides a method for preparing magnesium oxide from dolomite in the following manner:
S1, the dolomite is crushed and ball-milled, and then the milled dolomite powder is sieved in a 60-mesh sieve, and then the sieved powder is placed in a tube furnace at 950° C. for 2 h to obtain the calcined dolomite;
S2, the calcined dolomite is hydrated according to the liquid-solid ratio of 1 g/L, the hydration temperature is controlled at 70° C., the hydration time is 1.5 h, and the stirring speed of hydration is 30 r/min; filtration, washing, and vacuum drying are performed after hydration to obtain the hydration product;
S3, a certain amount of complexing agent is dissolved in deionized water to prepare a standby complex solution, the pH value of the complex solution is adjusted to 8 by 0.1 mol/L sodium hydroxide solution;
S4, then the complex solution is complexed with the hydration product obtained in S2, and the complexation temperature is controlled to be 40° C., the complexation time is 20 min, and the stirring speed is 30 r/min; after the reaction is completed, the primary product is obtained, the magnesium oxide is obtained after filtration, washing, vacuum drying.

Comparison Case 1

This comparison case provides a traditional method for preparing magnesium oxide from dolomite in the following manner:
S1, the dolomite is crushed and ball-milled, and then the milled dolomite powder is sieved in a 60-mesh sieve, and then the sieved powder is placed in a tube furnace at 1000° C. for 2 h to obtain the calcined dolomite;
S2, the calcined dolomite is digested, and the digestion temperature is controlled at 80° C. to obtain the dolomite lime milk;
S3, the sulfuric acid is added to the dolomite lime milk for acid hydrolysis, the pH value is controlled 6, the reaction temperature is 40° C., the magnesium sulfate extract solution and leaching residue containing $CaSO_4 \cdot 2H_2O$, and impurities are obtained;
S4, filtration is performed to obtain the magnesium sulfate solution and residue $CaSO_4 \cdot 2H_2O$ and other impurities;
S5, ammonia is added to the magnesium sulfate solution to make it react to form the magnesium hydroxide precipitate;
S6, filtration, drying, and then magnesium hydroxide is calcined in a tube furnace at a temperature of 900° C. to obtain the magnesium oxide.

Through the detection of the product and waste of Embodiment 1 and Comparison case 1, the product obtained in Embodiment 1 has no waste and no residue, in the whole process, no acid is used but a lower concentration of sodium hydroxide solution is used, and the whole process is simple and pollution-free.

Embodiment 2

This embodiment provides a method for preparing magnesium oxide from dolomite in the following manner:
S1, the dolomite is crushed and ball-milled, and then the milled dolomite powder is sieved in a 60-mesh sieve, and then the sieved powder is placed in a tube furnace at 950° C. for 2 h to obtain the calcined dolomite;

S2, the calcined dolomite is hydrated according to the liquid-solid ratio of 1 g/L, the hydration temperature is controlled at 50° C., the hydration time is 0.5 h, and the stirring speed of hydration is 30 r/min; filtration, washing, and vacuum drying are performed after hydration to obtain the hydration product;

S3, a certain amount of complexing agent is dissolved in deionized water to prepare a standby complex solution, the pH value of the complex solution is adjusted to 8 by 0.1 mol/L sodium hydroxide solution;

S4, then the complex solution is complexed with the hydration product obtained in S2, and the complexation temperature is controlled to be 50° C., the complexation time is 20 min, and the stirring speed is 60 r/min; after the reaction is completed, the primary product is obtained, the magnesium oxide is obtained after filtration, washing, vacuum drying, the purity rate is 96.2%.

Comparison Case 2

This comparison case provides a method for preparing magnesium oxide from dolomite in the following manner:

S1, the dolomite is crushed and ball-milled, and then the milled dolomite powder is sieved in a 60-mesh sieve, and then the sieved powder is placed in a tube furnace at 950° C. for 2 h to obtain the calcined dolomite;

S2, the calcined dolomite is hydrated according to the liquid-solid ratio of 1 g/L, the hydration temperature is controlled at 100° C., the hydration time is 2 h, and the stirring speed of hydration is 100 r/min; filtration, washing, and vacuum drying are performed after hydration to obtain the hydration product;

S3, a certain amount of complexing agent is dissolved in deionized water to prepare a standby complex solution, the pH value of the complex solution is adjusted to 8 by 0.1 mol/L sodium hydroxide solution;

S4, then the complex solution is complexed with the hydration product obtained in S2, and the complexation temperature is controlled to be 50° C., the complexation time is 20 min, and the stirring speed is 60 r/min; after the reaction is completed, the primary product is obtained, the magnesium oxide is obtained after filtration, washing, vacuum drying, the purity rate is 90.1%.

The final products obtained in Embodiment 2 and Comparison case 2 are compared, the product obtained in Embodiment 2 is purer and has no residue than the product obtained in Comparison case 2, indicating that in the hydration process, the hydration temperature is controlled at 40-90° C., the hydration time is controlled at 0.5-1.5 h, and the stirring speed of hydration is controlled at 30-90 r/min, which can ensure the purity of the obtained product and no residue.

Embodiment 3

This embodiment provides a method for preparing magnesium oxide from dolomite in the following manner:

S1, the dolomite is crushed and ball-milled, and then the milled dolomite powder is sieved in a 200-mesh sieve, and then the sieved powder is placed in a tube furnace at 950° C. for 3 h to obtain the calcined dolomite;

S2, the calcined dolomite is hydrated according to the liquid-solid ratio of 1 g/L, the hydration temperature is controlled at 50° C., the hydration time is 1 h, and the stirring speed of hydration is 30 r/min; filtration, washing, and vacuum drying are performed after hydration to obtain the hydration product;

S3, a certain amount of complexing agent is dissolved in deionized water to prepare a standby complex solution, the pH value of the complex solution is adjusted to 8 by 0.1 mol/L sodium hydroxide solution;

S4, then the complex solution is complexed with the hydration product obtained in S2, and the complexation temperature is controlled to be 60° C., the complexation time is 20 min, and the stirring speed is 60 r/min; after the reaction is completed, the primary product is obtained, the magnesium oxide is obtained after filtration, washing, vacuum drying, the purity rate is 95.8%.

Comparison Case 3

The ratio provides a method for preparing magnesium oxide from dolomite in the following manner:

S1, the dolomite is crushed and ball-milled, and then the milled dolomite powder is sieved in a 200-mesh sieve, and then the sieved powder is placed in a tube furnace at 950° C. for 3 h to obtain the calcined dolomite;

S2, the calcined dolomite is hydrated according to the liquid-solid ratio of 1 g/L, the hydration temperature is controlled at 50° C., the hydration time is 1 h, and the stirring speed of hydration is 30 r/min; filtration, washing, and vacuum drying are performed after hydration to obtain the hydration product;

S3, a certain amount of complexing agent is dissolved in deionized water to prepare a standby complex solution, the pH value of the complex solution is adjusted to 8 by 0.1 mol/L sodium hydroxide solution;

S4, then the complex solution is complexed with the hydration product obtained in S2, and the complexation temperature is controlled to be 100° C., the complexation time is 50 min, and the stirring speed is 100 r/min; after the reaction is completed, the primary product is obtained, the magnesium oxide is obtained after filtration, washing, vacuum drying, the purity rate is 97.2%.

The intermediate products and the final products of Embodiment 3 and Comparison case 3 are compared, the temperature of the complexation reaction is controlled to be 40-90° C., the time is 10-40 min, and the stirring speed is 30-90 r/min. Under those conditions, the yield of the obtained product can be guaranteed while ensuring purity.

In the case of the same hydration conditions, although the purity of the extracted magnesium oxide will increase by increasing the complexation temperature, complexation time, and complexation stirring speed, due to the increase of complexation temperature, complexation time, and complexation stirring speed, the complexation reaction is accelerated. Fast, calcium ions are complexed, and magnesium ions are also complexed in large quantities, resulting in a low yield of extracted magnesium oxide, only 3.1%. Therefore, in the case of suitable hydration conditions, only under the appropriate complexation conditions can the magnesium oxide with moderate yield and high purity be extracted.

Therefore, the invention is a process method for preparing magnesium oxide from dolomite, using dolomite as raw material, the amount of magnesium hydroxide generated by magnesium oxide at a specific hydration temperature and hydration time can be neglected, with the addition of a complexing agent, calcium ions are complexed to obtain magnesium oxide and a small amount of impurities, it has the advantages of a short preparation process, low energy consumption, low cost, and no residue.

Finally, it should be noted that the above embodiments are only used to explain the technical scheme of the invention rather than to restrict it. Although the invention is described in detail concerning the better embodiments, ordinary technicians in this field should understand that they can still modify or replace the technical scheme of the invention, and these modifications or equivalent replacements cannot make the modified technical scheme out of the spirit and scope of the technical scheme of the invention.

What is claimed is:

1. A process method for preparing magnesium oxide from a dolomite, comprising the following steps:
   S1, calcining the dolomite to obtain a calcined dolomite;
   S2, hydrating the calcined dolomite according to a solid-liquid ratio, controlling a hydration temperature and a hydration time, filtering, washing, and drying after a hydration to obtain a hydration product; wherein the solid-liquid ratio of the calcined dolomite is 0.5-2 g/L, the hydration temperature is 40-90° C., the hydration time is 0.5-1.5 h, and a stirring speed of the hydration is 30-90 r/min;
   S3, using a sodium hydroxide solution to adjust a pH value of a complex solution to 8-10; wherein a complexing agent is at least one of ethylenediaminetetraacetic acid disodium, triethanolamine, oxalic acid, and citric acid; and
   S4, performing a complexation reaction by mixing a hydration product in the step S2 with the complex solution in the step S3, controlling a complexation temperature and a complexation time, obtaining the magnesium oxide by filtering, washing, and drying after the complexation reaction is completed, wherein the complexation temperature is 40-90° C., the complexation time is 10-40 min, and a stirring speed of the complexation reaction is 30-90 r/min.

2. The process method for preparing the magnesium oxide from the dolomite according to claim 1, wherein in the step S1, first, crushing and ball-milling the dolomite to obtain a ball-milled dolomite powder, and sieving the ball-milled dolomite powder to obtain a sieved dolomite powder, wherein a mesh of a sieve is 60-200 mesh; and then calcining the sieved dolomite powder in a tube furnace, wherein a calcination temperature is 850-1100° C. and a calcination time is 1-3 h.

3. The process method for preparing the magnesium oxide from the dolomite according to claim 2, wherein in the step S3, a configuration process of the complex solution comprises: dissolving the complexing agent in 200-500 mL of deionized water, and stirring for 0.5 h at a rotation speed of 300-350 r/min.

4. The process method for preparing the magnesium oxide from the dolomite according to claim 3, wherein in the step S3, a concentration of the sodium hydroxide solution is 0.1 mol/L.

5. The process method for preparing the magnesium oxide from the dolomite according to claim 4, wherein for the step S2 and the step S4, washing conditions adopt washing with deionized water 3-5 times, and drying conditions adopt a vacuum drying.

* * * * *